US010383315B2

(12) United States Patent
Lipscomb

(10) Patent No.: US 10,383,315 B2
(45) Date of Patent: Aug. 20, 2019

(54) CLIP OR SNAP ON FILTER FOR SUBMERSIBLE PUMP

(71) Applicant: Pioneer Pet Products, LLC, Cedarburg, WI (US)

(72) Inventor: John M. Lipscomb, Cedarburg, WI (US)

(73) Assignee: Pioneer Pet Products, LLC, Cedarburg, WI (US)

(*) Notice: Subject to any disclaimer, the term of this patent is extended or adjusted under 35 U.S.C. 154(b) by 814 days.

(21) Appl. No.: 14/419,105

(22) PCT Filed: Aug. 1, 2013

(86) PCT No.: PCT/US2013/053289
§ 371 (c)(1),
(2) Date: Feb. 2, 2015

(87) PCT Pub. No.: WO2014/022704
PCT Pub. Date: Feb. 6, 2014

(65) Prior Publication Data
US 2015/0189862 A1    Jul. 9, 2015

Related U.S. Application Data

(60) Provisional application No. 61/678,209, filed on Aug. 1, 2012, provisional application No. 61/857,367, filed on Jul. 23, 2013.

(51) Int. Cl.
*A01K 29/00*    (2006.01)
*A01K 63/04*    (2006.01)
(Continued)

(52) U.S. Cl.
CPC .............. *A01K 63/045* (2013.01); *A01K 7/00* (2013.01); *A01K 29/00* (2013.01); *A01K 63/047* (2013.01);
(Continued)

(58) Field of Classification Search
CPC . A01K 7/00; A01K 7/02; A01K 29/00; A01K 63/045; A01K 63/047; B01D 29/01;
(Continued)

(56) References Cited

U.S. PATENT DOCUMENTS 4,186,093 A * 1/1980 Willinger ............. A01K 63/045
                                                    210/167.24
4,871,455 A * 10/1989 Terhune ................ B01D 29/15
                                                    210/232

(Continued)

FOREIGN PATENT DOCUMENTS

DE    202006005866    10/2006

OTHER PUBLICATIONS

EP Search Report dated Mar. 15, 2016 from corresponding EP App. No. 13 82 5037.
http://kalan-filter.ru/home_pump_filters.html, Dec. 10, 2013.

*Primary Examiner* — Lucas A Stelling
(74) *Attorney, Agent, or Firm* — Boyle Fredrickson S.C.

(57) ABSTRACT

A modular filter for a submersible pump that has a filter housing with an integrally formed pump coupling that telescopically receives pail of a housing of the pump and a filter chamber defined by a pair of spaced apart perforate sidewalls having filter media disposed therebetween. The perforate filter chamber defining sidewalls are opposed to one another with one of the perforate sidewalls defining a first intake grate inline with an intake of the pump and the other one of the perforate sidewalls defining at least one second intake grate that can function as a bypass should the filter media inline with the first intake grate become plugged. In a preferred embodiment, the other one of the perforate sidewalls includes a filtrate grate adjoining the at least one second intake grate. In a preferred embodiment, the other one of the sidewalls has a pair of spaced apart second intake grates outboard of the pump intake that are generally copla- (Continued)

nar with the filtrate grate. A preferred pump coupling of the filter extends outwardly defining a pump-receiving socket that telescopically receives part of the pump housing enclosing the pump intake disposing the pump intake inline with the first intake grate. In a preferred embodiment, the pump coupling includes a locator arrangement such as a locator arrangement formed of a locator edge and locator notch or arcuate recess that respectively seat against outwardly extending features of the pump housing, such as one or more suction cups or cup mounts and/or the pump outlet or discharge tube. The pump coupling can also include a plurality of latches that releasably engage part of the pump housing to help keep the filter securely mounted to the pump.

19 Claims, 11 Drawing Sheets

(51) Int. Cl.
*A01K 7/00* (2006.01)
*B01D 29/01* (2006.01)
*B01D 35/02* (2006.01)
*B01D 35/26* (2006.01)
*C02F 1/00* (2006.01)

(52) U.S. Cl.
CPC .............. *B01D 29/01* (2013.01); *B01D 35/02* (2013.01); *B01D 35/26* (2013.01); *C02F 1/001* (2013.01); *B01D 2201/4084* (2013.01)

(58) Field of Classification Search
CPC .............................. B01D 35/02; B01D 35/26; B01D 2201/4084; C02F 1/001
See application file for complete search history.

(56) References Cited

U.S. PATENT DOCUMENTS

| | | | |
|---|---|---|---|
| 5,087,357 A * | 2/1992 | Villa | A01K 63/045 |
| | | | 119/259 |
| 5,501,790 A * | 3/1996 | Wiedemann | A01K 63/045 |
| | | | 210/109 |
| 2006/0060514 A1 | 3/2006 | Chauquet | |
| 2007/0023338 A1 | 2/2007 | Newman | |
| 2010/0043367 A1 | 2/2010 | Desjardins | |
| 2010/0300366 A1 * | 12/2010 | Lipscomb | A01K 7/02 |
| | | | 119/74 |
| 2011/0067638 A1 * | 3/2011 | Lipscomb | A01K 7/02 |
| | | | 119/74 |
| 2012/0017840 A1 | 1/2012 | Allis | |
| 2012/0180730 A1 * | 7/2012 | Liu | A01K 7/02 |
| | | | 119/74 |

* cited by examiner

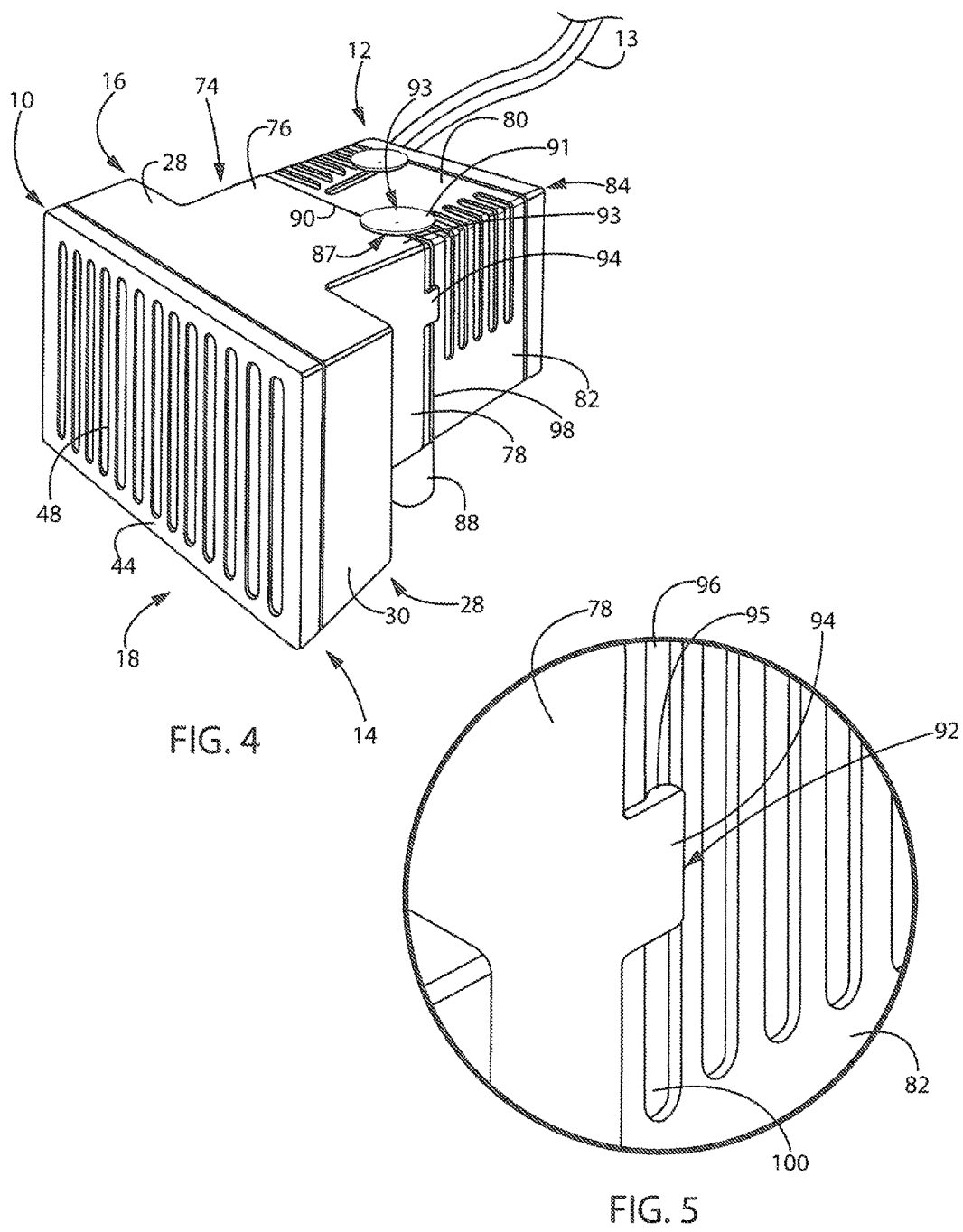

CLIP OR SNAP ON FILTER FOR SUBMERSIBLE PUMP

CROSS-REFERENCE TO RELATED APPLICATION

This application claims priority under 35 U.S.C. § 119(e) in U.S. Application Ser. No. 61/678,209, filed Aug. 1, 2012, and in U.S. Provisional Patent Application No. 61/857,367, filed Jul. 23, 2013, the entirety of each of which is expressly incorporated by reference herein.

FIELD

The present invention is directed to a water filter and more particularly to a water filter for use with a submersible electric pump that is particularly well suited for use in recirculating pet fountains and the like.

INTRODUCTION

Water filtration devices are used in a variety of animal and pet applications. Such devices help ensure that the water that an animal drinks is of a desired quality, and rid of potential contaminants. In aquarium applications, water filtration can be critical to ensure that an animal is living in a clean environment to avoid disease and potential death.

A growing trend in regards to pets, such as cats for example, involves fountain style water containers. Instead of having a regular bowl or dish from which a pet drinks, these fountains offer slow moving water that is circulated by a pump. Many animals prefer to drink water from these types of devices. However, with any system of moving water, it is desirable to try to ensure that the water quality remains consistent to minimize the risk of buildup of potential contaminants that could harm the animal. Therefore, many of these fountains include filtration devices.

In the field of aquarium filters, many filtration options are enclosed in large housings including built in pumps that are hung from aquarium walls. Such assemblies can be very bulky and difficult to remove and/or clean. Another issue with many water filters is the possibility that the water filter will clog. In the event that it clogs, many water filters can no longer accept the flow of additional water. Without any movement, water may sit in place for extended periods of time resulting in unpleasant appearance.

What is needed therefore is a compact water filter that can be used in conjunction with a submersible water pump that addresses one or more of the above-mentioned issues.

SUMMARY

The present invention is directed to a filter that directly mounts to a submersible pump, such as a submersible aquarium pump, that filters water before entering the pump and may be capable of bypassing filter media within the filter when the filter media has become plugged. The filter includes a housing that defines a coupling used to removably mount the filter to the pump and a filter chamber that positions filter media within the filter between an intake of the pump and an intake of the filter.

The filter housing also defines a plurality of perforate filter walls with one of the perforate filter housing walls defining a first perforate grate having at least a portion of the first perforate grate disposed inline with the pump intake and a second perforate grate having at least a portion of the second perforate grate disposed inline with the pump intake in between the pump intake and first perforate grate. In a current embodiment, the plurality of perforate filter housing walls includes one perforate filter housing wall defining a primary intake grate inline with the pump intake and another filter housing wall that defines a pair of spaced apart intake grates that can also function as a bypass when filter media inline with the primary intake grate becomes plugged.

In a current embodiment, the filter housing has a pair of generally parallel perforate filter housing walls with one of the perforate filter housing walls defining a primary intake grate inline with the pump intake and the other one of the perforate filter housing walls having a filtrate grate inline with the pump intake between the pump intake and primary intake grate and having a pair of secondary intake grates outboard or laterally disposed relative to the pump intake that can also function as a bypass should the filter media inline with the primary intake grate become plugged. In another preferred embodiment, the filter housing has a plurality of pairs of intake grates with one of the intake grates being a primary intake grate inline with the pump intake having a filter intake surface area greater than the surface area of the pump intake and a pair of secondary intake grates disposed adjacent to and outboard of the pump intake. One or both secondary intake grates can also function as a bypass to permit water flow to the pump intake should the filter media inline with the primary intake grate becomes plugged. Being located outside and adjacent to the pump intake, the secondary intake grates advantageously minimize the length of the path water must travel during bypass flow when the primary intake grate is plugged and/or filter media is plugged enabling bypass flow of water to be able to flow completely around any plugged filter media located between a secondary intake grate and the pump intake.

The coupling of the filter can be and preferably is integrally formed of the filter housing in a manner that conforms to at least a portion of the pump sidewall encompassing the pump intake when the coupling telescopically receives the pump during attachment of the filter to the pump. In a preferred embodiment, the coupling is formed of a plurality of sidewalls forming a pump receiving socket having a substantially complementary shape as the sidewalls that define the pump housing that encompass the pump intake. Such a coupling includes a plurality of pump seats that engage the pump in a manner that helps attachment of the filter to the pump and which preferably also helps properly locate the filter on the pump during attachment.

In a current embodiment, the coupling has a locator arrangement that includes a plurality of locators that help the filter seat on the pump in a manner that locates the filtrate grate in close proximity to the pump intake such that the filtrate grate overlies and is disposed inline with the pump intake. In a preferred embodiment, the locator arrangement includes a first locator that is a locator edge of the pump coupling that seats against portion of the pump, such as preferably one or more of the suction cups or suction cup mounts of the pump, and can include a second locator, such as a locator notch or arcuate locator recess, which seats against an outlet or discharge tube of the pump to properly orient and locate the filter on the pump when the filter is attached to the pump.

The pump coupling preferably is constructed and arranged to releasably engage the housing of the pump in a manner that securely attaches the filter to the pump. Such a coupling is configured to telescopically receive part of the pump housing in a manner that preferably forms a substantially watertight seal therebetween.

In a preferred embodiment, the pump coupling includes a releasable latch arrangement formed of a plurality of spaced apart latches that releasably engage corresponding portions of a pump housing sidewall to help releasably keep the filter attached to the pump when attached to the pump. In a preferred embodiment of the latch arrangement, each latch is formed of a flexible and resilient finger that is releasably received in a recess, such as a seam or pocket, formed in the pump housing that helps keep the filter mounted to the pump when attached to the pump.

BRIEF DESCRIPTION OF THE DRAWINGS

One or more preferred exemplary embodiments of the invention are illustrated in the accompanying drawings in which like reference numerals represent like parts throughout and in which:

FIG. 4 illustrates a bottom perspective view of the clip or snap on filter attached to the submersible water pump at the seam of the submersible water pump of one embodiment;

FIG. 5 illustrates a detailed view of the releasable latch arrangement of the clip or snap on filter attached to a recess of the submersible water pump of another preferred embodiment;

Figure 1:
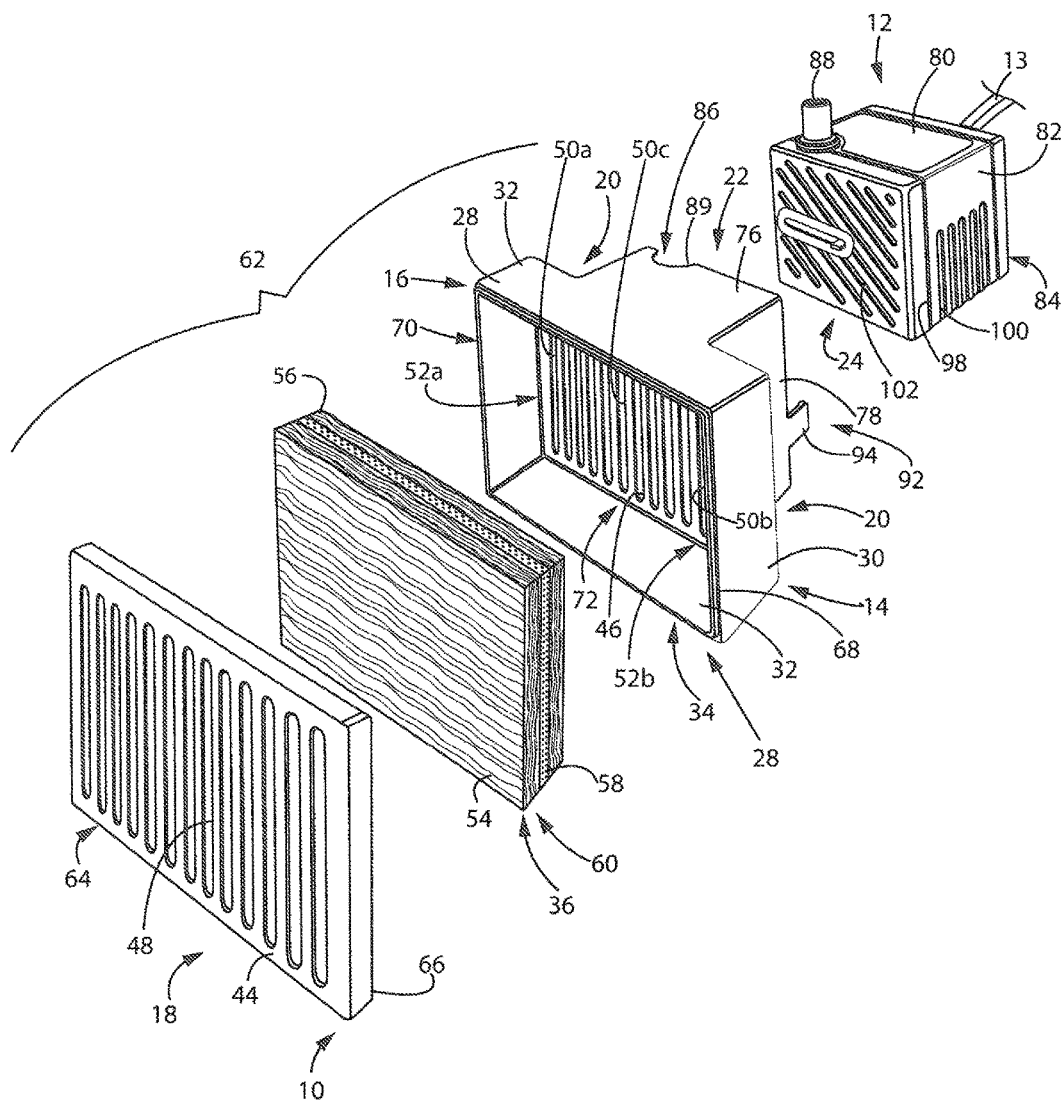
FIG. 1 illustrates a perspective view of a clip or snap on filter and a submersible water pump, wherein the clip or snap on filter is exploded to show the interior.

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

FIGS. 1-4 illustrate a filter 10 that is releasably attachable to a submersible water pump 12 enabling water drawn into the pump 12 to be filtered by the filter 10 before entering the pump 12. The filter 10 includes a filter housing 14 that defines an intake manifold 16, e.g. generally T-shaped intake manifold, having a plurality of filter intakes 18 and 20 through which water enters and is filtered before flowing out a filtrate outlet 22 into an intake 24 of the pump 12. In the preferred embodiment shown in the drawing figures, the filter 10 is of clip-on or snap-on construction configured to provide a snap-fit with the pump 12 disposing the filtrate outlet 22 directly inline with and overlying the pump intake 24 producing a pump and filter assembly 62 of compact and snap together construction having a filter 10 that can be quickly, easily and inexpensively retrofitted to existing submersible pumps 12.

The pump 12 preferably is a submersible electrically powered aquarium pump that is electrically powered. The pump 12 includes an electrical power cord 13 extending outwardly from the pump housing 84 to an electrical power source, such as to an electric utility power source having at least 110 volts alternating current. In a preferred embodiment, the pump 12 has an electrical cord 13 connected to a step-down electrical transformer (not shown) that reduces the electrical current from 110-125 volts alternating current to no more than 25 volts. In a preferred embodiment, the transformer steps down the electrical current used to power the pump 12 to no more than 12 volts and which can change the current from alternating current to direct current.

In the preferred embodiments of the filter 10 shown in the drawings, the filter 10 has at least one primary filter intake 18 disposed inline with the filtrate outlet 22 of the filter 10 and inline with the intake 24 of the pump 12 and has at least one secondary filter intake 20 disposed outboard of and adjacent to the filtrate outlet 22 of the filter 10 that can also function as a filter bypass 26 when water flow through the primary filter intake 18 is substantially reduced or completely obstructed. In the preferred embodiment of the filter 10 shown in the drawings, the filter 10 has (a) a primary filter intake 18 disposed (i) inline with the filtrate outlet 22 and (ii) inline with the pump intake 24, and (b) a pair of spaced apart secondary filter intakes 20 disposed on either side of the filtrate outlet 22 outboard of the pump intake 18 that can each function as a bypass should water flow through the primary filter intake 18 become substantially completely obstructed.

The filter housing 14 includes a housing body 28 having at least one imperforate sidewall 30, such as the imperforate sidewalls 30 and 32 shown in the drawing figures, which help define a filter chamber 34 in which filter media 36 is received locating the filter media 36 between the filter intakes 18 and 20. In the preferred filter embodiment shown in the drawing figures, when filter media 36 is received in the filter chamber 34, the filter media 36 is located between the primary filter intake 18 and the filtrate outlet 22.

Figure 6:
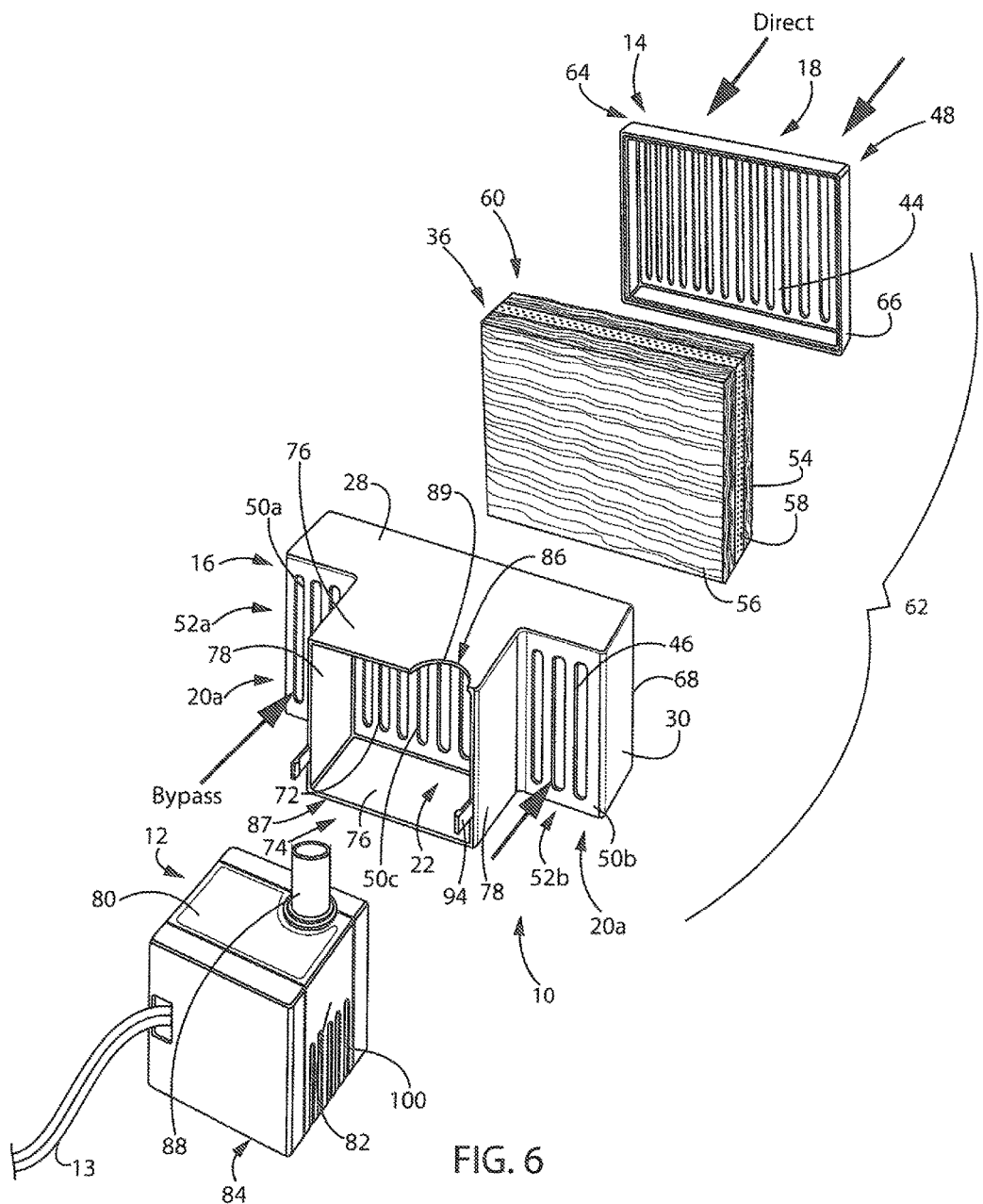
FIG. 6 illustrates a reverse perspective view of a clip or snap on filter and a submersible water pump of FIG. 1 with arrows indicating the direct and bypass flows.

The filter housing 14 includes a plurality of perforate filter housing walls 44 and 46 that further help define the filter chamber 34 in which filter media 36 is received. With reference to FIG. 1, one of the perforate filter housing walls 44 defines a perforate filter intake grate 48 that forms the primary filter intake 18. With reference to FIG. 6, the other one of the perforate filter housing walls 46 has at least one perforate section 50a and 50b that defines a perforate intake grate 52a and 52b that defines the secondary intake 20a and 20b. In the preferred filter embodiments shown in the drawings, the other one of the perforate filter housing walls 46 has a pair of perforate sections 50a and 50b that respectively define secondary perforate intake grates 52a and 52b that respectively form secondary filter intakes 20a and 20b that are located outboard of and adjacent to the pump intake 24.

In the preferred filter embodiments shown in the drawings, the perforate filter housing walls 44 and 46 form a pair of spaced apart end walls 44 and 46 of the filter housing 14 with one of the end walls 46 facing toward and in fluid flow communication with the intake 24 of the pump 12 and the other one of the end walls 44 facing away from the pump intake 24. In a preferred filter embodiment constructed in accordance with the present invention, the perforate filter housing walls 44 and 46 can be generally parallel to one another with filter media 36 in the filter chamber 34 disposed between the perforate filter housing walls 44 and 46.

The filter media 36 can be of porous or fibrous construction, such as where constructed of synthetic fiber, e.g., polyester fiber, cotton, cellulose, e.g., paper, fiberglass, foam or another suitable filter material, which is constructed to block or trap particles of debris and the like. Such filter media 36 can include a plurality of filter media layers 54 and 56 and can include an odor, taste or other type of neutralizing layer 58, such as a layer 58 of activated charcoal or carbon disposed between fibrous filter media layers 54 and 56. The filter media 36 can be part of a replaceable filter cartridge or insert 60, such as of generally rectangular construction, which can fluid-tightly seat against an inner surface of the imperforate filter housing sidewalls 30 and 32 when received in the filter chamber 34. One example of filter media in replaceable form is disclosed in U.S. Patent Application Publication No. 2010/0300366, the entirety of which is expressly incorporated herein by reference.

With reference to FIG. 1, the filter 10 can be formed of a filter assembly 62 where one of the perforate filter housing walls 44 or 46 forms a filter chamber cover 64 that is removably attached to part of the filter housing body 28 enabling filter media 36 to be removed from the filter chamber 34 and replaced with new filter media 36. In a preferred filter embodiment, the cover 64 is formed of the perforate filter housing wall 44 that defines the primary intake grate 48 and is configured for snap fit engagement with part of the filter housing body 28. For example, in a preferred embodiment, an outer peripheral edge 66 of the primary intake grate 48 releasably mates with an outer edge 68 of a filter chamber mouth 70 with one or both of the edges 66 and/or 68 defining a snap-fit cover seating configuration enabling the primary intake grate 48 to be snapped onto the filter housing body 28 removably retain filter media 36 received in the filter chamber 34.

Figure 7:
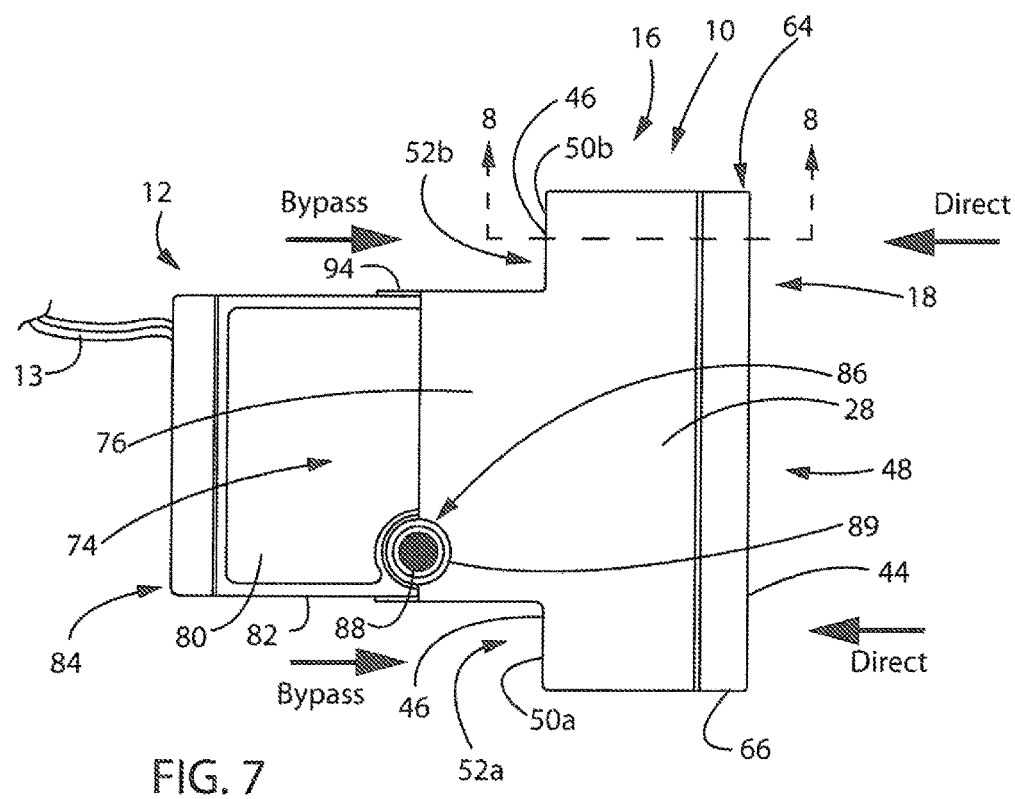
FIG. 7 illustrates a top elevation view of the clip or snap on filter attached to the submersible water pump with arrows indicating the direct and bypass flows.
Figure 8:
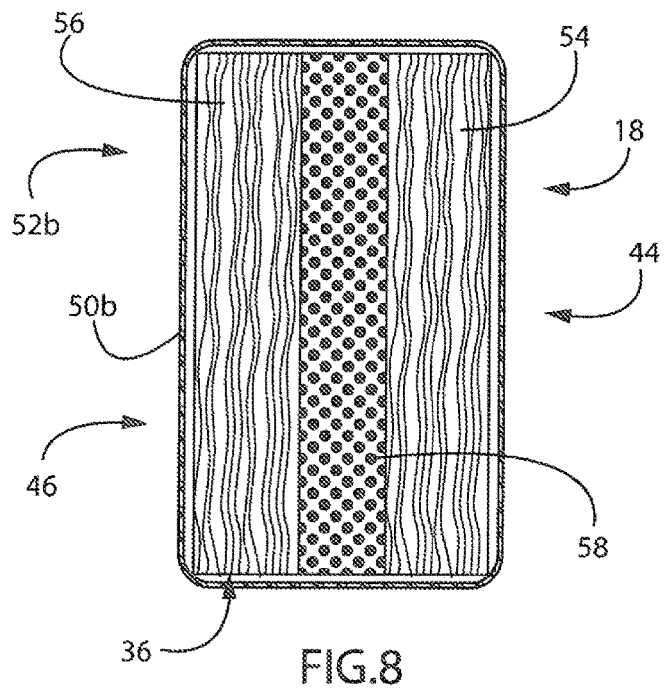
FIG. 8 illustrates a cross section of the filter material received in the filter chamber of the filter taken along line 8-8 of FIG. 7.

FIG. 7 provides an elevation view of the assembly with the different types of flow labeled. In a preferred embodiment, one of the perforate filter housing walls 44 defines the primary intake grate 48 that is inline with the pump intake 24 and the other one of the perforate filter housing walls 46 has a pair of perforate wall sections 50a and 50b defining a pair of spaced apart secondary intake grates 52a and 52b disposed adjacent to and outboard of the pump intake 24 that can also function as a filter bypass when either the primary intake grate 48 and/or filter media 36 inline with the primary intake grate 48 becomes clogged or otherwise plugged. In a preferred embodiment, the perforate housing wall 46 disposed adjacent the pump intake 24 has another perforate wall section 50c located in between perforate wall sections 50a and 50b that is disposed inline with and overlying the pump intake 24. In one such preferred embodiment, the intermediate perforate wall section 50c defines a filtrate outlet grate 72 that abuts or adjoins the pump intake 24 when the filter 10 is snapped onto the pump 12.

In the preferred filter embodiment shown in FIGS. 1-4, one of the perforate filter housing walls 44 defines a primary intake grate 48 inline with the pump intake 24 where the primary intake grate 48 has an intake surface area that is greater than the surface area of the pump intake 24. In the preferred embodiment shown in FIGS. 1-4, the other one of the perforate filter housing walls 46 defines a pair of secondary intake grates 52a and 52b each of which can also function as a plugged filter bypass. The other one of the perforate filter housing walls 46 also can define a filtrate grate 72 disposed inline with the pump intake 24 and primary intake grate 48 that overlies the pump intake 24.

In a preferred embodiment, the perforate filter housing walls 44 and 46 are generally parallel with the secondary intake grates 52a and 52b adjoining the filtrate grate 72. In a preferred embodiment, both perforate filter housing walls 44 and 46 are generally planar defining a generally planar primary intake grate 48 and a pair of secondary intake grates 52a and 52b that are disposed in substantially the same plane as the filtrate grate 52c.

Figure 2:
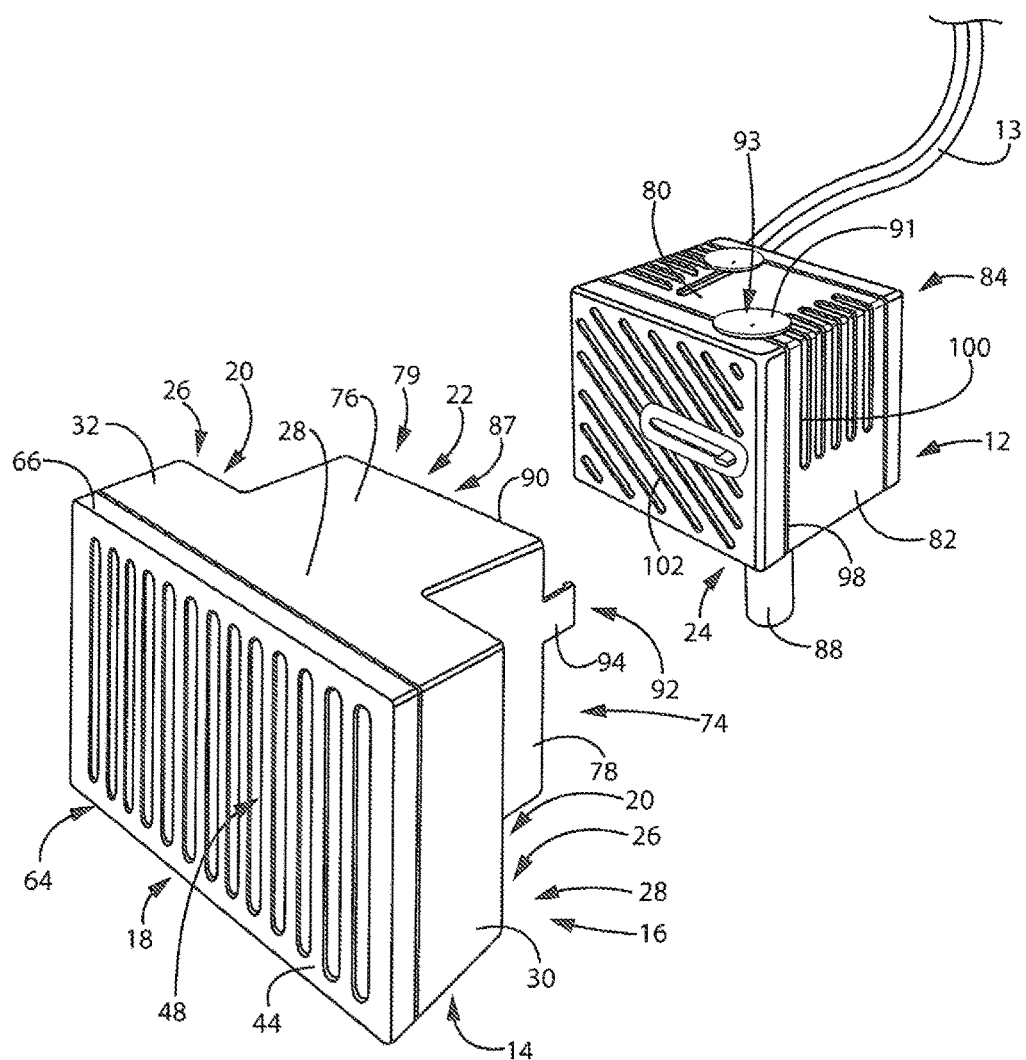
FIG. 2 illustrates the reverse bottom side perspective of the clip or snap on filter and submersible water pump.
Figure 3:
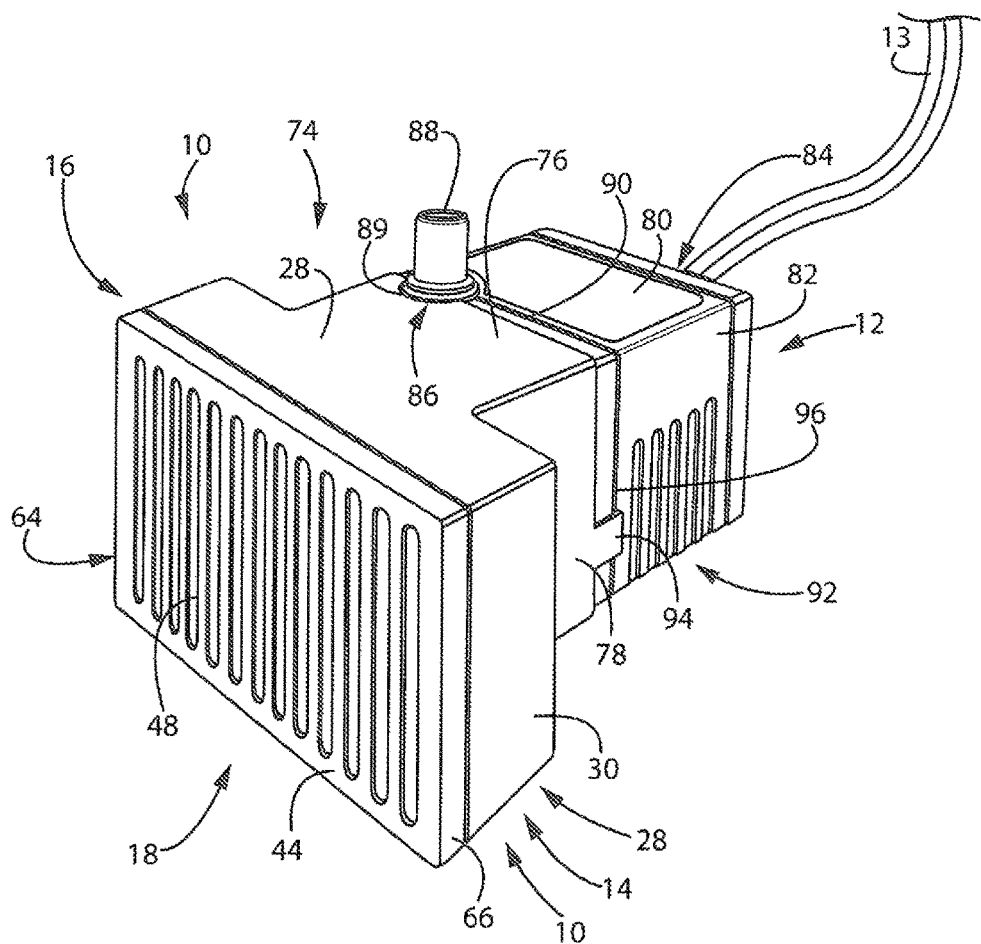
FIG. 3 illustrates the top side perspective of the clip or snap on filter attached to the submersible water pump.

As shown in FIGS. 3-5 and 7, the filter 10 includes a coupling 74 such that the filter 10 may be releasably attached to the pump 12. As is best shown in FIGS. 1-3, the pump coupling 74 is integrally formed by part of the filter housing 14 that is formed in a manner that defines a pump-receiving socket 79 having a shape generally complementary with part of a housing 84 of the pump 12 enabling the filter 10 and pump 12 to telescopically register with one another when attaching the filter 10 to the pump 12. In the preferred embodiment shown in FIGS. 1-3, the socket 79 defined by the pump coupling 74 is configured to telescopically receive part of the pump housing 84, such as in the manner discussed in more detail below, enabling part of the pump housing 84 to be inserted into the socket 79. As is also discussed in more detail below, in addition to the coupling 74 defining a socket 79 that telescopically receives part of the pump housing 84 during assembly, the coupling 74 can be and preferably is configured to releasably engage part of the pump housing 84 adjacent the socket 79 in a manner that opposes withdrawal of the part of the pump housing 84 received in the socket 79.

The pump coupling 74 can be formed of at least one plurality of opposed coupling sidewalls 76 arranged to define the socket 79 that telescopically couples with the pump 12 when the filter 10 is attached to the pump 12. In a preferred embodiment, the coupling 74 is formed of a plurality of opposed coupling sidewalls 76 and 78 defining a socket 79 that can be generally rectangular in which part of the pump 12 carrying the pump intake 24, such as that part of the housing 84 of the pump 12 in which the intake 24 is formed or disposed, is telescopically received. When the intake-side of the pump 12 is telescopically received in the pump receiving socket 79 of the pump coupling 74 of the filter 10, the pump intake 24 is oriented so it faces toward the primary intake grate 48 of the filter 10 such that a substantially straight line extends through a central portion of the primary filter intake grate 48, a central portion of filter media 36 received in the filter chamber 34, and the pump intake 24.

The coupling 74 of the filter 10, which can be integrally formed of the filter housing body 28, extends outwardly with its plurality of opposed sidewalls 76 and 78 configured to substantially complementarily conform to respective sidewalls 80 and 82 of a generally block-shaped or cubic housing 84 of the pump 12 thereby encompassing the pump intake 24 when the coupling 74 receives the pump 12 during attachment of the filter 10 to the pump 12. Such a coupling 74 is configured to help ensure a substantially watertight connection between the filter 10 and the pump 12, while additionally ensuring the filter 10 and pump 12 are properly oriented with the pump intake 24 thereby locating the pump intake 24 inline with a central portion of the primary filter intake grate 48.

To help locate the filter 10 when attaching the filter 10 to a pump 12, the filter 10 can and preferably does include one or more pump or pump housing locators integrally formed of part of the filter housing 14. To help securely, yet releasably attach the filter 10 to a pump 12, the filter 10 can include one or more integrally formed latches 92 that releasably engage part of the pump housing 84 when the filter 10 is attached to the pump 12. Such a latch 92 or latches 92 is or are configured for snap fit engagement with part of the pump 12 such as part of a housing 84 of the pump 12. In addition, one or more of the locators of the filter housing 14 can help not only locate the filter 10 relative to the pump 12 during assembly but can also help keep the filter 10 mounted to the pump 12 by minimizing play or wiggle therebetween. If desired, one or more of the pump locators integrally formed in the filter housing 14 can be configured to engage part of the pump 12, such as part of the pump housing 84, during assembly thereby helping to prevent disassembly or detachment of the filter 10 from the pump 12 during use and operation. In at least one embodiment, one or more of the locators are configured to frictionally engage part of the pump housing 84 in a manner that cooperates with the pump housing 84 functioning as a couple as discussed in more detail below that actually attaches to part of the pump housing 84 requiring force to detach it from that part of the pump housing 84 when disassembling or detaching the filter 10 from the pump 12.

In a preferred embodiment, one of the plurality of opposed the sidewalls 76 of the filter coupling 74 includes a locator 86 that registers with a discharge tube 88 of the pump 12 that can be an arcuate locator recess 89 formed in an outer edge 90 of the coupling sidewall 76. In another preferred embodiment, one of the other opposed sidewalls 76 and/or 78 can include another locator 87 that registers with or abuts against part of the pump 12, such as part of the pump housing 84. In one such preferred embodiment, an outer edge 90 of one coupling sidewalls 76 abuts against a mount 91, e.g., suction cup, or holder 93 of the mount 91, e.g. suction cup holder, of the pump 12 used to attach the pump 12 to a generally flat or planar surface. The holder 93 of the mount 91 can be integrally formed of the bottom wall of the pump housing 84. In one such embodiment, part of the outer edge 90 of coupling sidewall 76 defines a locator 87 that abuts against part of an outwardly extending suction cup holder 93 integrally formed of part of the pump housing 84. If desired, such a locator 87 can be a locator recess that can have an arcuate shape that can be substantially complementary to part of the suction cup holder 93. In another preferred embodiment, the coupling 74 includes a plurality of such locators 86 and/or 87.

In the preferred filter embodiment as shown in FIGS. 3-6, the coupling 74 includes a plurality of locators 86 and/or 87 that help the filter 10 seat on the pump 12 in close proximity such that filtrate grate 72 remains inline with the pump intake 24. Specifically, the coupling 74 may include a plurality of locators on the edge of one or more of the plurality of opposed coupling sidewalls 76 and/or 78 of the filter 10 that seats against outwardly extending features of the pump housing 84. For instance, the coupling 74 may feature a locator 87 that seats against part of the pump such as a suction cup 92 or other mounting device used to mount the pump 12 to a pet fountain basin or aquarium bottom. An additional locator 86 may be provided such as an arcuate locator recess 89 that receives an outlet or discharge tube 88 of the pump 12. These locators allow the filter 10 to be properly oriented and located onto the pump 12 when the filter 10 is attached to the pump 12. If desired, one or more additional coupling locators may be configured to register with, seat with and/or couple various features of a submersible pump having a similar but somewhat different configuration than pump 12.

The coupling 74 may also include one or more latches 92 that help releasably engage the housing 84 of the pump 12 with the filter 10. In the preferred embodiment illustrated in detail in FIG. 5, each latch 92 can be formed of a flexible finger or snap 94 having a snap hook 95 that clips onto part of the pump housing 84 such as by snaps into a pump seam recess 96, such as a seam 98 or pocket 100 formed in the pump housing 84, to releasably attach the filter 10 to the pump 12. Together the fingers or snaps 94 form a latch 92 of snap fit engagement that provides a snap fit with the pump housing 84. Each latch 92 is formed of a flexible but resilient material, such as by integrally molded of the filter housing 14 enabling the filter 10 to be repeatedly removed from a pump 12 and then re-attached to the pump 12. Operating as a whole, these features of the filter coupling 74 preferably produces and maintains a substantially watertight seal between the filter 10 and pump 12 when the filter 10 is attached to the pump 12.

Figure 9:
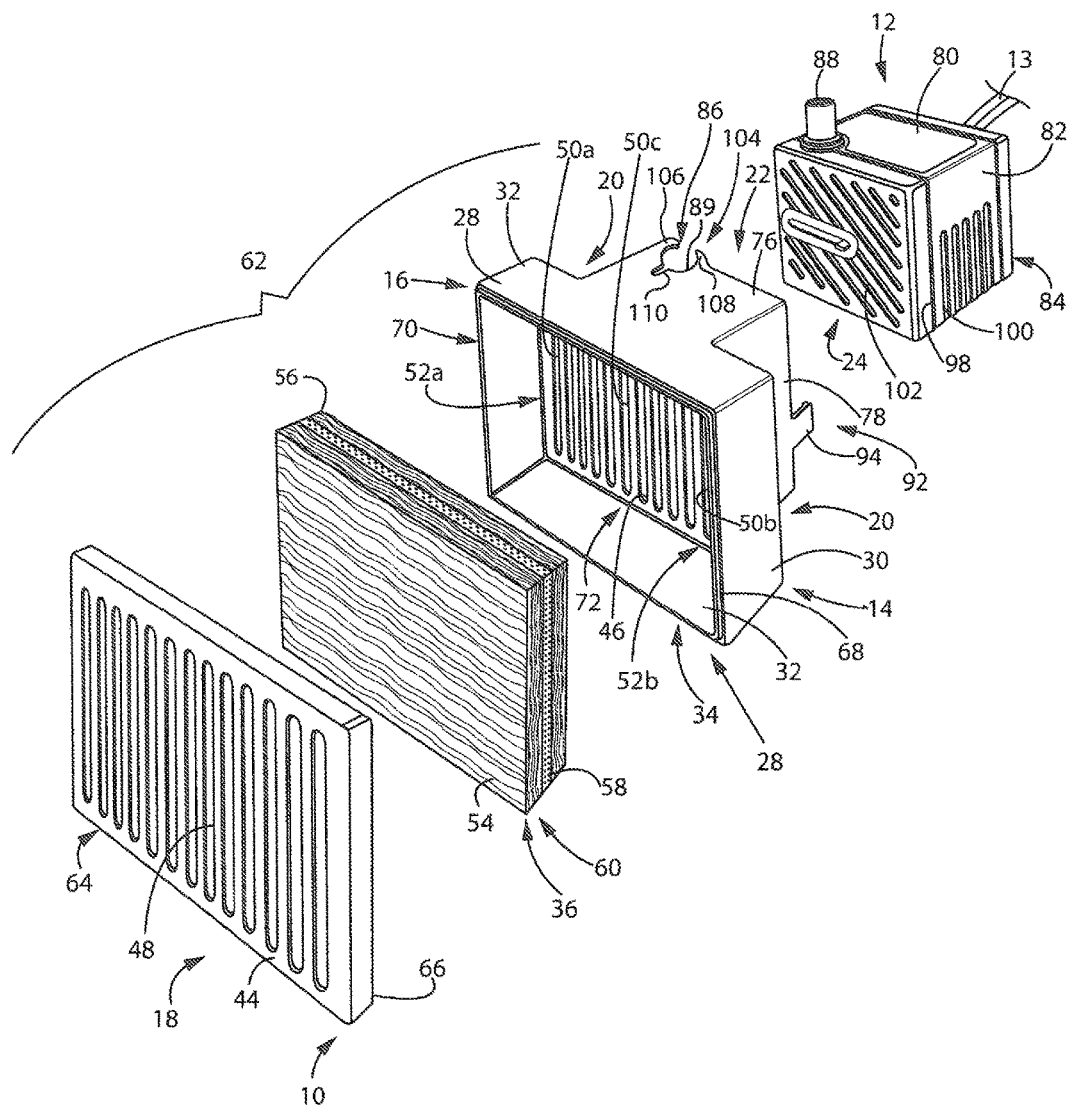
FIG. 9 illustrates a perspective view of a clip or snap on filter and a submersible water pump in accordance with an another preferred embodiment in which the filter includes an arcuate locator recess configured to receive the discharge tube of the pump.

Turning now to FIGS. 9-13, and initially FIG. 9, in another preferred filter embodiment, locator 86 may include coupling 104 that is configured to releasably engage the discharge tube 88 of the pump 12 within the arcuate locator recess 89 when the pump 12 is received within filter housing 14. In a preferred embodiment, the discharge tube coupling 104 may be configured to provide a snap fit with the pump discharge tube 88 that engages the tube 88 with a snap fit so as to snap onto the tube 88 during attachment of the filter 10 to the pump 12.

Figure 11:
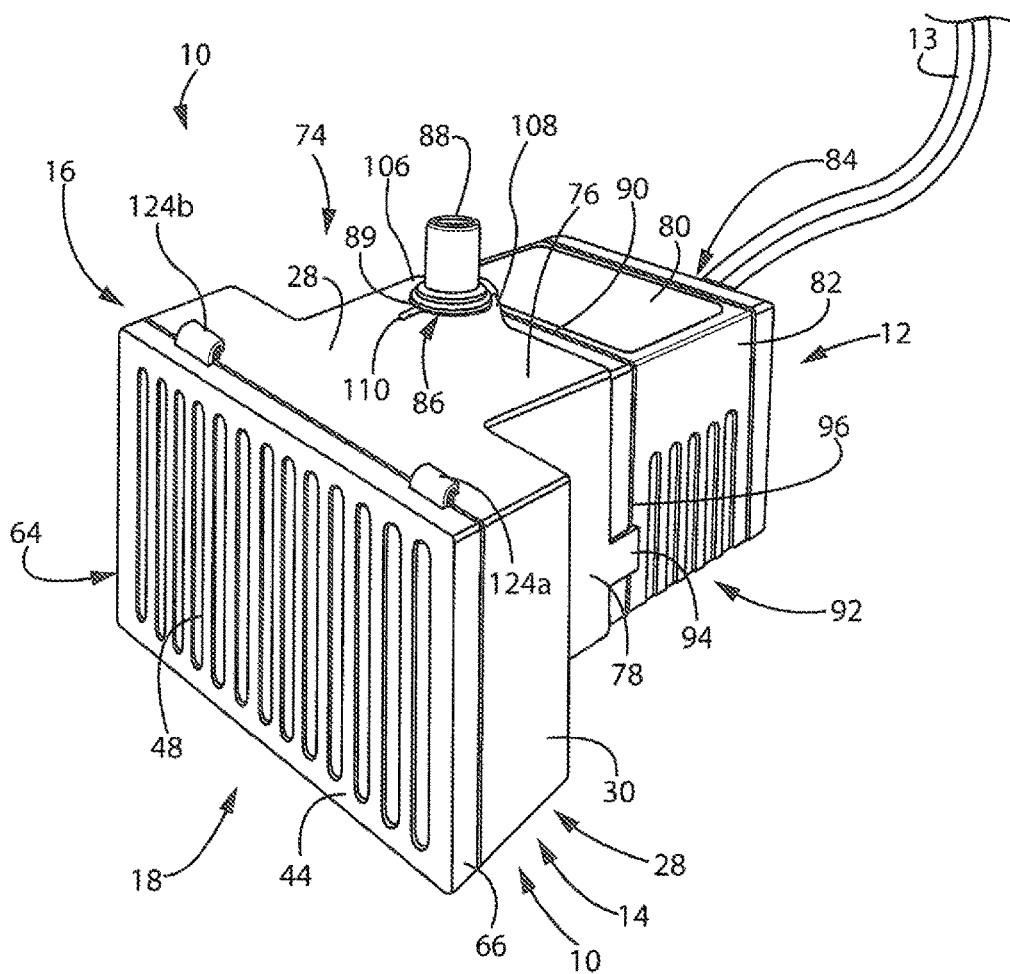
FIG. 11 illustrates the top side perspective of the preferred embodiment clip or snap on filter shown in FIG. 9 attached to the submersible water pump with the arcuate locator recess receiving the discharge tube of the pump.

The coupling 104 may include a first arm 106 and a second arm 108 that extend beyond the rear edge 90 of the filter housing 14 coupling 74. The pump discharge tube engagement arms 106, 108 are configured to deform or flex around the discharge tube 88 and snap into place around a portion of the discharge tube 88, as shown in FIG. 11, when the pump 12 is received within the coupling 74 of the filter housing 14 providing a snap-fit therebetween. If desired, when the pump 12 is removed from the filter housing 14, the arms 106, 108 may flex or deform outwardly to allow the discharge tube 88 to be removed from the locator 86. To help facilitate such flexure, a relief opening 110 that can be oblong, such as in the shape of a slot, may be formed in the filter housing 14 communication with the locator 86 by extending to the void or recess in the filter housing 14 that defines the locator 86. Such a relief opening 110 can be located between the pump discharge tube engagement arms 106, 108 to provide flexibility to the coupling 104 as needed to enable the arms 106, 108 to snap around the pump discharge tube 88 during attachment of the filter 10 to the pump 12.

Figure 10:
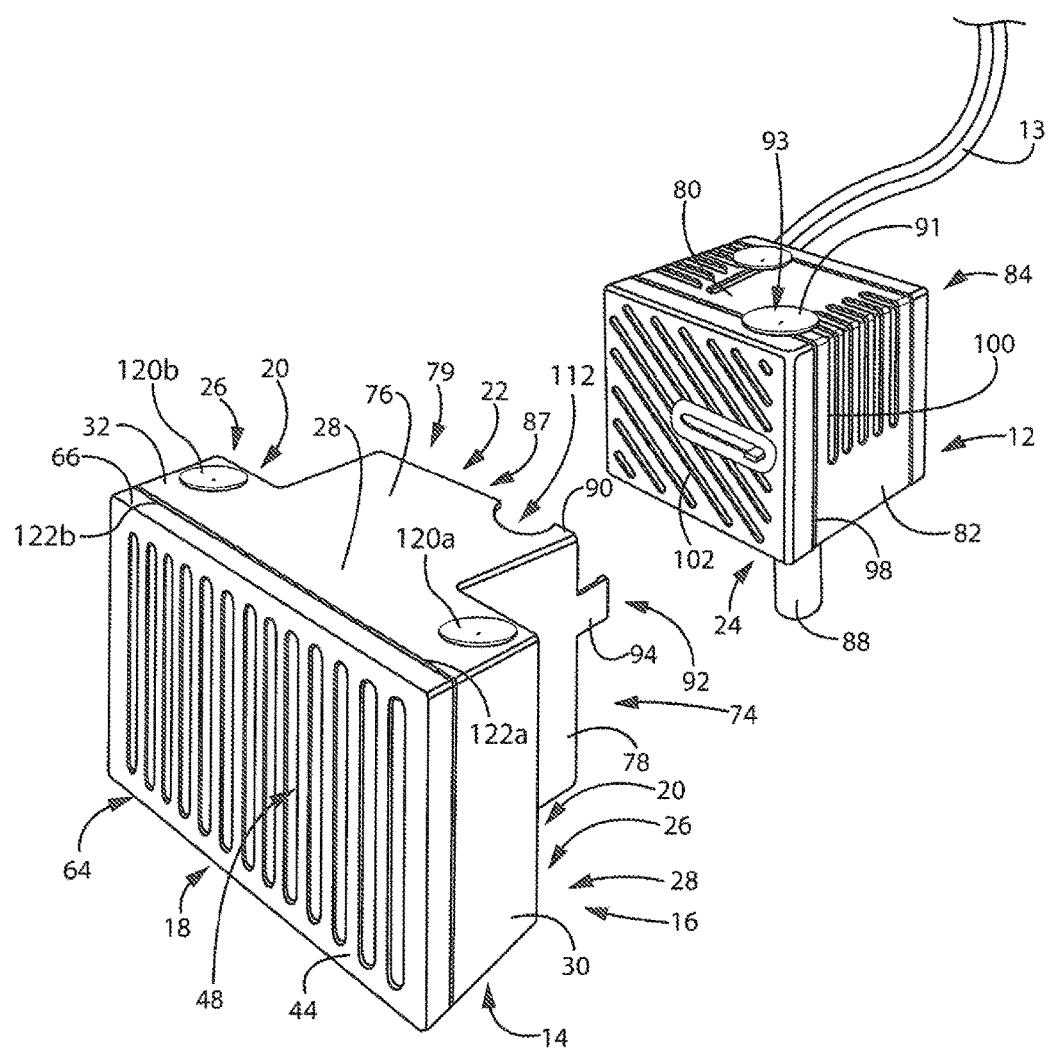
FIG. 10 illustrates the reverse bottom side perspective of the preferred embodiment clip or snap on filter and submersible water pump shown in FIG. 9, in which the filter includes an arcuate locator recess configured to receive a suction cup mount of the pump.

Turning now to FIG. 10, on the opposing side 76 of the filter housing 14, the locator 87 may also include a pump foot locator 112 that can be configured to register with either part of the pump housing 84 to which adjacent suction cup 93 is attached or the adjacent suction cup 93 itself of the pump 12 or can be part of the pump housing 84 that holds the suction cup 93, when the pump 12 and filter 10 are being removably coupled to one another. The locator 112 may be a curved, arcuate or semicircular recess that is substantially complementary to the part of the pump housing 84 that is configured to hold the suction cup 93 and/or can be substantially complementary to part of the suction cup 93.

Where configured as a pump foot locator 112, the locator 112 registers with the part of the pump housing 84 that holds the suction cup 93, such as a suction cup mount 91 (FIG. 2) integrally formed in the pump housing 84, from which the suction cup 93 outwardly extends or part of the suction cup 93 itself to help locate the filter housing 14 relative to the pump housing 84 and/or vice versa. This not only facilitates attachment of the filter 10 to the pump 12, but it also helps keep the filter 10 properly located while attached or mounted to the pump 12 thereby also helping keeping them together including by helping to limit wiggle or side-to-side motion of the pump 12 relative to the filter 10 after mounting within a basin of a recirculating fountain, e.g. recirculating pet fountain, as well as during use and operation of the pump 12 and fountain.

If desired, the locator 112 can be configured to include a coupling (not shown) like the coupling 104 of locator 86 shown in FIG. 9 having a pair of flexible opposed arms 106, 108 that flex when they snap onto part of the pump housing 84 that holds the suction cup 93 and/or when they snap onto part of the suction cup 93, such as a necked down or narrow part of the suction cup 93 that extends into engagement with the pump housing 84. Such a locator 112 can therefore be configured to provide snap fit engagement with the suction cup holding, e.g., suction cup mount 91, part of the pump housing 84 and/or part of the suction cup 84 enabling positive but releasable engagement therewith.

The bottom locator 112 can therefore be configured to releasably engage the suction cup holder of the pump 12 and/or part of the suction cup 93 of the pump 12 when the pump 12 is inserted into the socket 79 of the filter housing 14 during attachment of the filter 10 to the pump 12. As a result, the filter 10, particularly the filter housing 14, is integrally configured to provide frictional or snap-fit engagement with the pump 12 at a plurality of spaced apart locations, including between the pump coupling 74 and pump housing sidewalls, and the discharge tube coupling 104 and the pump discharge tube 88. Where the bottom locator 87 of the filter housing 14 also is integrally configured with a locator 112 configured to provide snap-fit engagement with adjacent suction cup 93 and/or suction cup holder or mount, e.g. suction cup mount 91, the filter housing 14 is therefore configured with a plurality of pairs, i.e., at least three, spaced apart pump couplings that even further facilitate positive, secure and removable attachment to the pump 12.

If desired, the filter housing 14, and namely body 28 may include additional suction cups of holders 120a, 120b used to attach the filter housing 14 to a generally flat or planar surface. The holders 120a, 120b can be integrally formed of the bottom wall of the filter housing 14. e.g., suction cup, or holder 93 of the mount 91, e.g. suction cup holder, of the pump 12 used to attach the pump 12 to a generally flat or planar surface.

Figure 12:
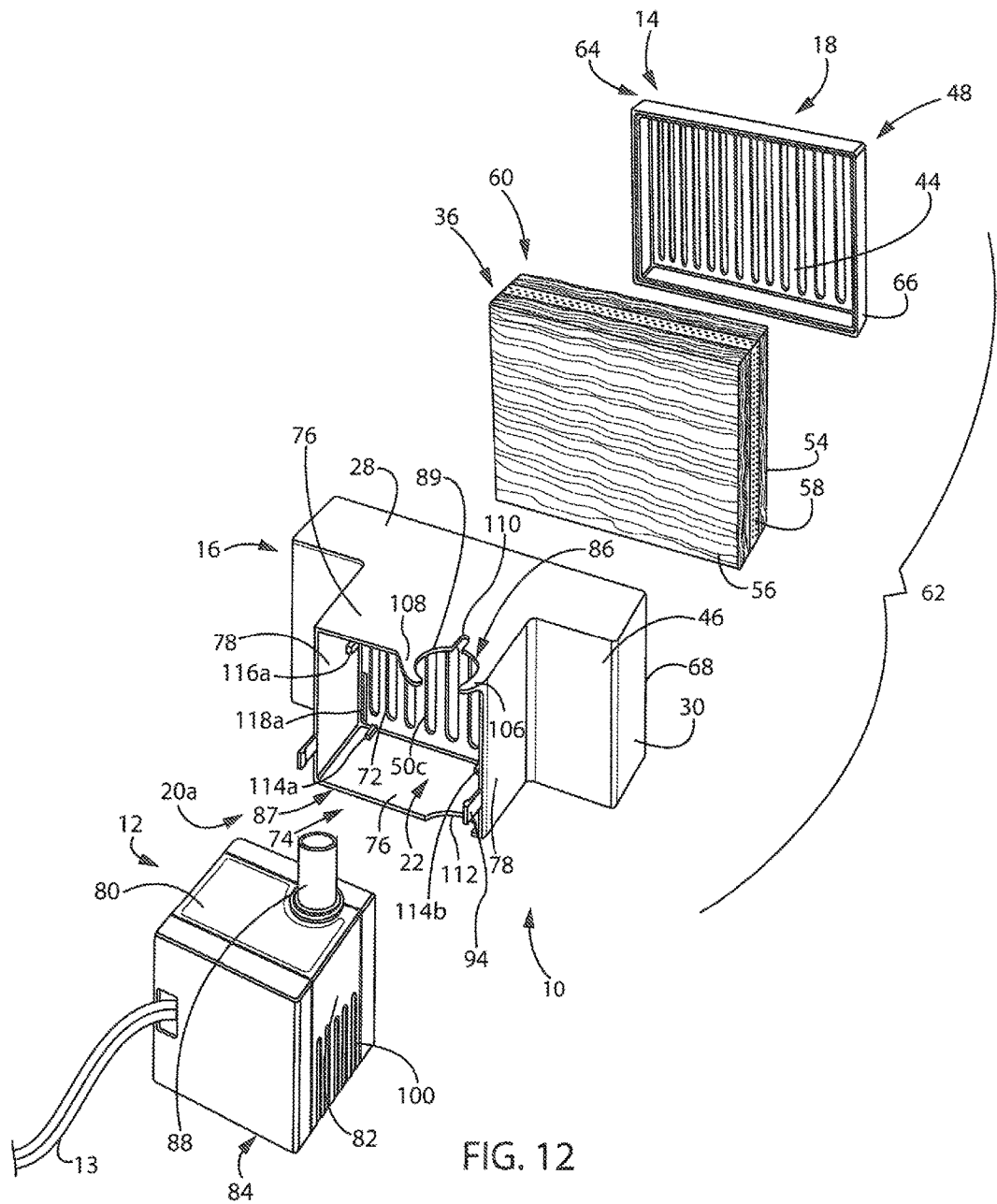
FIG. 12 illustrates a reverse perspective view of the preferred embodiment of the clip or snap on filter and a submersible water pump of FIG. 9.
Figure 13:
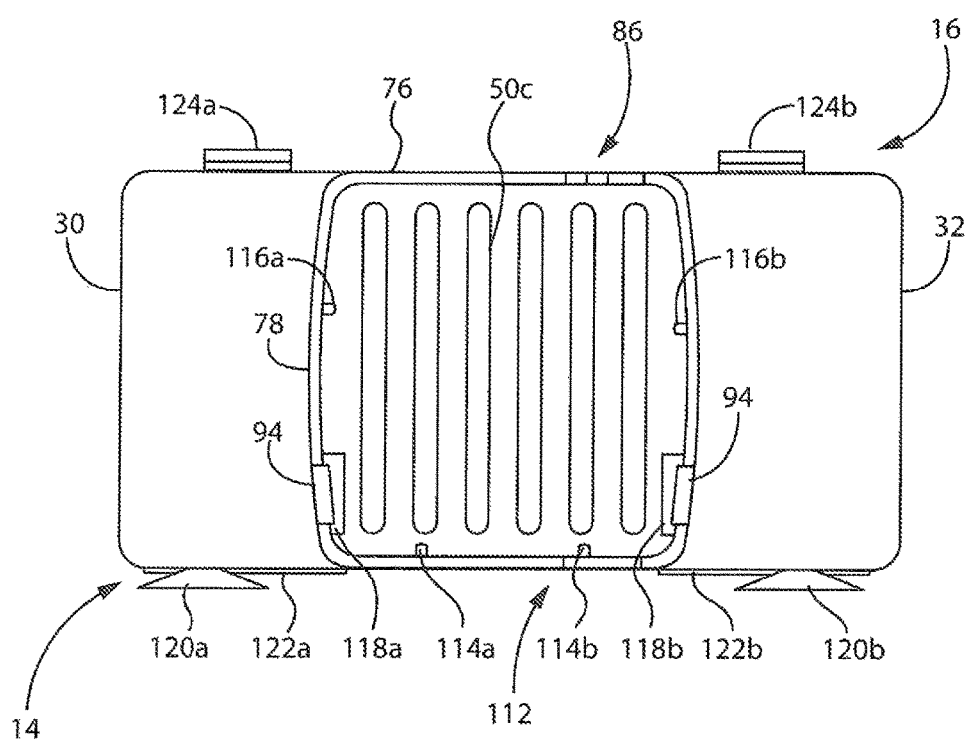
FIG. 13 illustrates a side elevation view of the preferred embodiment clip or snap on filter of FIG. 9.

In accordance with another preferred filter embodiment, the coupling 74 may include a plurality of internal protrusions that engage the pump 12, when the pump 12 is fully and properly seated within the coupling 74. Turning now to FIGS. 12 and 13, and specifically FIG. 13, the coupling 74 may include a first and second base protrusion 114a, 114b and a first and second side protrusion 116a, 116b. The plurality of protrusions 114a, 114b, 116a, 116b are configured to engage the pump intake grate 102 of the pump 12, when the pump 12 is seated within the coupling 74. The dispersed locations of the protrusion 114a, 114b provide multiple points of engagement between the pump intake grate 102 and coupling 74, to further ensure that the pump 12 is properly seated within the coupling 74, and prevent the pump from being tilted or otherwise misaligned. The protrusions 114a, 114b, 116a, 116b are preferably sized such that they do not impede the flow of water through the filter 10 and into the pump 12. Additionally, grate apertures 118a, 118b may also be present in the perforate wall section 50c of housing wall 46, disposed adjacent the pump intake 24 to provide for decreased resistance on pump 12.

As previously discussed, in a preferred filter embodiment, the cover 64 is formed of the perforate filter housing wall 44 that defines the primary intake grate 48 and is configured for snap fit engagement with part of the filter housing body 28. In such a preferred filter embodiment, the cover 64 is formed of the perforated filter housing wall 44 that defines the primary intake grate 48 and is configured to be hingedly attached to the filter housing body 28, as illustrated in FIGS. 11 and 13. The cover 64 may be hingedly attached to the filter housing body 28 at lower portion of the peripheral edge 66 of the cover 64, and configured to rotate about hinges 122a, 122b, wherein hinges 122a, 122b have a rotational axis perpendicular to perforate filter housing wall 44. When the cover 64 is closed, the catches 124a, 124b will engage on the side of the filter housing body 28 along the lower portion of the peripheral edge 66 of the cover 64 opposite of the hinges 122a, 122b. In this configuration the cover 64 of the filter 10 may be repeatedly opened and closed to replace the filter media 36 as needed.

In application, the assembly of the filter 10 to the pump 12 requires little time and no tools. Upon identifying a compatible filter 10 and pump 12 combination, the user will line up the filter coupling 74 with the pump intake 24. The filter coupling socket 79 should be of a substantially complimentary shape as the pump intake 24 such that the pump intake 24 is encompassed by the socket 79. As the user slides the pump 12 into the socket 79, each latch finger 94 in the preferred embodiment will be received in part of the pump seam recess 96 formed in the pump housing 84. Locators 86 and/or 87 of the filter 10 help properly seat the pump 12 in the coupling 74 such that a substantially watertight seal is created between the filter 10 and the pump 12. If present, the couplings 104, 112 and plurality of protrusions 114a, 114b, 116a, 116b further ensure that the pump 12 is properly and fully seated within the coupling 74. To detach the filter 10 from the pump 12, the user will only need to pull the filter 10 and pump 12 apart by pulling them away from one another. Due to the flexible, but resilient material of the latch fingers 94, the fingers 94 will bend or flex enough to disengage the filter coupling 74 from the pump 12, as will the arms 106, 108 of the coupling 104, if present. The filter 10 may again be releasably attached to the pump 12 as described above.

After the connection between the filter 10 and the pump 12 is complete, this assembly may be put into use. Once the pump 12 is turned on, the assembly will begin to circulate water. Initially, the filter media 36 is clean and the water will first flow through the intake grates 48, 52a and 52b. A substantial majority of the water flows through the primary intake grate 48 located inline with the pump intake 24 enabling straight line flow of water through the filter media 36 located therebetween minimizing the pressure drop between the intake grate 48 and pump intake 24. At least some water enters through both secondary intake grates 52a and 52b which can also reduce the pressure drop. This reduced pressure drop advantageously efficiently filters water before it passes through the pump 12 minimizing pumping energy lost overcoming such a pressure drop.

As the water passes through the filter housing 14, the filter media 36 will remove contaminants and clean the water. The water will next move out of the filter 10 through the filtrate grate 72 that overlies a pump intake grate 102 and into the pump intake 24. Next, the water will flow through the pump 12 and out of the pump discharge tube 88 to be recirculated into the environment.

As the filter 10 is further used, the filter media 36 may eventually become clogged such that water flow through the filter media 36 disposed between the intake grate 48 and pump intake 24 becomes substantially diminished or stopped. As a result of this condition, water may not be able to enter through the primary intake grate 48. If this occurs, the amount of water entering the secondary intake grates 52a and 52b will increase. While the amount of pressure drop will increase, it will still be suitably low such that flow out the discharge tube 88 will not be substantially diminished.

As the filter media 36 between the secondary intake grates 52a and 52b and the filtrate outlet grate 72 becomes clogged, the increased pressure drop that results will cause water entering one or both secondary intake grate 52a and/or 52b to flow laterally around the filter media 36 between the filter media 36 and portion(s) of the filter housing 14 between the secondary intake grate(s) 52a and/or 52b and the filtrate outlet grate 72. Thus, even when substantially all of the filter media 36 is substantially completely clogged or plugged, one or both secondary intake grates 52a and/or 52b function as bypasses because they are adjacent to (disposed alongside) and in close proximity to the pump intake 24. This ensures a sufficient volume of water will always be able to be drawn into the secondary grates 52a and/or 52b that will maintain pump operation. Such a T-shaped filter manifold shape advantageously helps minimize pressure drop while including secondary intakes 20a and 20b that can revert to functioning as filter bypasses in the event that the filter media 36 and/or the primary intake 18 become plugged, blocked or otherwise obstructed. Such a T-shaped filter manifold construction minimize pressure loss during bypass operation by locating the secondary intakes (bypass intakes) 20a and 20b in close proximity right next to the pump intake 24 on opposite sides of the intake 24.

In still another preferred filter embodiment, as illustrated in FIG. 13, the filter 10 may lack one or both secondary intake grate(s) 52a and/or 52b. In such an embodiment, the clogged or plugged filter media will result in a substantial impedance to water flow through the filter 12. As a result, the volume of water output from the pump will diminish, and provide a visual indication of the need for filter media replacement and/or cleaning.

Such a filter 10 and pump 12 assembly is especially well suited for use in recirculating pet fountains, such as the pet fountain disclosed in U.S. Patent Application Publication No. 2011/0067638, the entirety of which is expressly incorporated herein by reference. In water pet fountains, water is continuously discharged from the outlet tube 88 of the pump 12 in the present invention out a spout. From the spout, the water may flow down a sloped surface that can include a drinking bowl into a pet fountain reservoir or basin. The pet may drink from the spout, the slopped surface, the drinking bowl, or the reservoir. Within the reservoir, a filter 10 attached to a pump 12 may be placed below the opening for the spout. By placing the filter 10 and pump 12 assembly into such a fountain, potential contaminants such as pet hair and other debris may be removed. The water will move through the filter 10 and pump 12 together as an assembly, i.e. a coupled pump and filter assembly, as described above, before being recirculated through the spout at the top of the fountain.

As a result of a filter 10 constructed in accordance with the present invention that securely yet removably clips or snaps onto a pump 12 with both the filter 10 and pump 12 having at least one suction cup used to removably anchor or mount the coupled or attached filter and pump as an assembly to part of a recirculating fountain, e.g., basin, the additional suction cup(s) help more securely and stably keep the pump 12 in its proper place or location as well as keep the pump 12 more securely and stably anchor the pump 12 to the fountain basin. In addition, such an assembly of a pump 12 coupled or attached to a filter 10 constructed in accordance with the present invention can help keep the pump intake from being obstructed for a longer period of time. This can also help produce a quieter operating fountain, not only by the filter absorbing and/or otherwise attenuating pump noise, but keeping the pump intake from being obstructed for a longer period of time also helps maintain quieter pump operation for a longer period of time.

Understandably, the present invention has been described above in terms of one or more preferred embodiments and methods. It is recognized that various alternatives and modifications may be made to these embodiments and methods which are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A filter for a submersible pump having a pump housing with a pump intake and an outwardly extending pump discharge, the filter comprising:
   a filter housing that is configured to releasably engage the pump housing, the filter housing including
      a perforated wall that defines a filter intake, a
      a filter chamber that is configured to receive filter media,
      a perforated wall that defines a filter outlet, that is located between the filter chamber and the pump intake, and that is disposed in line with the pump intake; and
      a coupling that is configured to telescopically register with part of the pump; and,
   wherein the filter housing comprises at least one hinge disposed at an edge of a wall of the filter housing, and wherein the hinge is configured to rotate a filter cover comprising the filter intake about a rotational axis of the hinge.

2. A filter for a submersible pump comprising:
   a filter housing that releasably engages a housing of the pump overlying an intake of the pump; wherein the filter housing comprises a coupling configured to releasably engage a discharge tube of the pump; and wherein the filter housing comprises a filter chamber and
   a filter outlet disposed in line with one another and with
   the intake of the pump;
wherein the pump discharge tube coupling comprises a
   pair of snaps that snap around the pump discharge tube
   and is configured for snap fit engagement with the
   pump discharge tube; and,
wherein the pair of snaps comprises a first and second
   arcuate arm configured to resiliently deform around the
   pump discharge tube for a snap fit engagement with the
   pump discharge tube.

3. A filter for a submersible pump comprising:
a filter housing configured to releasably engage a housing
   of the pump, the filter housing comprising:
   an inlet,
   an outlet arranged downstream from the inlet in a
      direction of fluid flow, and
   a contiguous imperforate perimeter that extends
      between the inlet and the outlet, a filter chamber
      being defined between the inlet and the outlet and
      being fully surrounded by the contiguous imperforated perimeter;
   a socket having an outer wall extending linearly downstream from the outlet and having an opening downstream further comprising at least one notch extending entirely through a depth of the outer wall of the socket and extending upstream from an outer edge of the outer wall towards the outlet, wherein the outer wall of the socket has a first socket wall that lies in a first plane with a first portion of the contiguous imperforate perimeter, and the at least one notch is a first notch that lies within the first plane; and
a filter medium disposed within the filter chamber.

4. The filter of claim 3, wherein the outer wall of the socket has a second socket wall that lies in a second plane with a second portion of the contiguous imperforate perimeter, and the at least one notch is a second notch that lies within the second plane.

5. The filter of claim 4, wherein the first plane is parallel to the second plane.

6. A filter for a submersible pump comprising:
a filter housing configured to releasably engage a housing
   of the pump, the filter housing comprising:
   an inlet,
   an outlet arranged downstream from the inlet in a
      direction of fluid flow, and
   a contiguous imperforate perimeter that extends
      between the inlet and the outlet, a filter chamber
      being defined between the inlet and the outlet and
      being fully surrounded by the contiguous imperforated perimeter;
   a socket having an outer wall extending linearly downstream from the outlet and having an opening downstream, further comprising a pair of secondary inlets disposed outboard of the socket and adjacent to the outlet; and
a filter medium disposed within the filter chamber.

7. The filter of claim 6, wherein the outlet and the pair of secondary inlets are coplanar with one another.

8. The filter of claim 7, wherein the inlet and the outlet are parallel with one another.

9. A filter for a submersible pump comprising:
a filter housing configured to releasably engage a housing
   of the pump, the filter housing comprising:
   an inlet,
   an outlet arranged downstream from the inlet in a
      direction of fluid flow, and
   a contiguous imperforate perimeter that extends
      between the inlet and the outlet, a filter chamber
      being defined between the inlet and the outlet and
      being fully surrounded by the contiguous imperforated perimeter;
   at least one mount that extends outwardly from the
      contiguous imperforate perimeter of the filter housing and that is configured to mount the filter to a
      generally planar surface;
   a socket having:
      an outer wall extending linearly downstream from
         the outlet and having a downstream opening,
      a notch extending entirely through an entire depth
         the outer wall of the socket and extending
         upstream from an outer edge of the outer wall
         towards the outlet, and wherein the at least one
         mount extends outwardly from a portion of the
         contiguous imperforate perimeter of the filter
         housing that is coplanar with the notch; and
   a filter medium disposed within the filter chamber.

10. The filter of claim 9, wherein the notch is configured to generally perpendicularly register with a side of a mount extending from a surface of the pump.

11. A filter for a submersible pump comprising:
a filter housing configured to releasably engage a housing
   of the pump, the filter housing comprising:
   an inlet,
   an outlet arranged downstream from the inlet in a
      direction of fluid flow, and
   a contiguous imperforate perimeter that extends
      between the inlet and the outlet, a filter chamber
      being defined between the inlet and the outlet and
      being fully surrounded by the contiguous imperforated perimeter;
   wherein the filter housing comprises at least one hinge
      disposed at an edge of a wall of the filter housing,
      and wherein the hinge is configured to rotate a filter
      cover comprising the filter intake about a rotational
      axis of the hinge; and
a filter medium disposed within the filter chamber.

12. A filter for a submersible pump comprising:
a filter housing configured to releasably engage a housing
   of the pump, the filter housing comprising:
   an inlet,
   an outlet arranged downstream from the inlet in a
      direction of fluid flow, and
   a contiguous imperforate perimeter that extends
      between the inlet and the outlet, a filter chamber
      being defined between the inlet and the outlet and
      being fully surrounded by the contiguous imperforated perimeter;
   a socket having an outer wall extending linearly downstream from the outlet and having an opening downstream;
   at least one notch extending entirely through a depth of
      the outer wall of the socket and extending upstream
      from an outer edge of the outer wall towards the
      outlet;
   wherein the notch comprises a pair of snaps, the pair of
      snaps defining a first and second arcuate arm configured to resiliently deform upon engagement with
      a pump housing; and
a filter medium disposed within the filter chamber.

13. A filter for a submersible pump comprising:
a rectangular filter housing having first and second
   opposed ends located in-line with one another, the filter housing having a rectangular perimeter wall that extends between the first and second ends, wherein an untreated fluid inlet is located in the first end and has a first perforate wall disposed therein, a socket is formed in the second end, a treated fluid outlet is formed in the filter housing between and in-line with the first and second ends and has a second perforate wall disposed therein, wherein a filter chamber extends between and is bounded at opposed ends thereof by the first and second perforate end walls, and is surrounded by the rectangular perimeter wall, a filtration medium removably disposed within the filter chamber, and wherein a perimeter of the filter chamber is fully surrounded by a contiguous imperforate portion of the rectangular perimeter wall;

wherein the socket further comprises an outer wall extending linearly downstream from the treated fluid outlet and having an opening downstream and at least one notch extending entirely through a depth of the outer wall of the socket and extending upstream from an outer edge of the outer wall towards the treated fluid outlet; and wherein the outer wall of the socket has a first socket wall that lies in a first plane with a first portion of the contiguous imperforate portion of the rectangular perimeter wall, and the at least one notch is a first notch that lies within the first plane.

14. The filter of claim 13, wherein the outer wall of the socket has a second socket wall that lies in a second plane with a second portion of the contiguous imperforate portion of the rectangular perimeter wall, and the at least one notch is a second notch that lies within the second plane.

15. The filter of claim 14, wherein the first plane is parallel to the second plane.

16. The filter of claim 13, wherein the notch comprises a pair of snaps, the pair of snaps defining a first and second arcuate arm configured to resiliently deform.

17. A filter for a submersible pump comprising:

a rectangular filter housing having first and second opposed ends located in-line with one another, the filter housing having a rectangular perimeter wall that extends between the first and second ends, wherein an untreated fluid inlet is located in the first end and has a first perforate wall disposed therein, a socket is formed in the second end, a treated fluid outlet is formed in the filter housing between and in-line with the first and second ends and has a second perforate wall disposed therein further comprising a pair of secondary inlets disposed outboard of the socket and adjacent to the outlet, a filter chamber extends between and is bounded at opposed ends thereof by the first and second perforate end walls, and a perimeter of the filter chamber is fully surrounded by a contiguous imperforate portion of the rectangular perimeter wall, and wherein a filtration medium is removably disposed within the filter chamber.

18. The filter of claim 17, wherein the outlet and the pair of secondary inlets are coplanar with one another.

19. A filter for a submersible pump comprising:

a rectangular filter housing having first and second opposed ends located in-line with one another, the filter housing having a rectangular perimeter wall that extends between the first and second ends, wherein an untreated fluid inlet is located in the first end and has a first perforate wall disposed therein, a socket is formed in the second end, a treated fluid outlet is formed in the filter housing between and in-line with the first and second ends and has a second perforate wall disposed therein, wherein a filter chamber extends between and is bounded at opposed ends thereof by the first and second perforate end walls, and a perimeter of the filter chamber is fully surrounded by a contiguous imperforate portion of the rectangular perimeter wall, at least one hinge disposed at an edge of a wall of the filter housing, and wherein the hinge is configured to rotate a filter cover comprising the untreated fluid inlet about a rotational axis of the hinge, and wherein a filtration medium is removably disposed within the filter chamber.

* * * * *